(12) United States Patent
Ibrahim et al.

(10) Patent No.: US 12,259,514 B2
(45) Date of Patent: Mar. 25, 2025

(54) DIAGENESIS-CALIBRATED ROCK QUALITY (DCRQ) DETERMINATION

(71) Applicant: Saudi Arabian Oil Company, Dhahran (SA)

(72) Inventors: Mohd Azizi Ibrahim, Dhahran (SA); Mohammed Fuad Alzayer, Al Qatif (SA); Layal Nour Alhussain, Dammam (SA); Faisal Naif Al-Enezi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 384 days.

(21) Appl. No.: 17/804,907

(22) Filed: Jun. 1, 2022

(65) Prior Publication Data
US 2023/0393302 A1    Dec. 7, 2023

(51) Int. Cl.
*G01V 20/00*    (2024.01)

(52) U.S. Cl.
CPC .......... *G01V 20/00* (2024.01); *G01V 2200/16* (2013.01)

(58) Field of Classification Search
None
See application file for complete search history.

(56) References Cited

U.S. PATENT DOCUMENTS

| | | | |
|---|---|---|---|
| 10,400,590 B1 * | 9/2019 | Aldred | E21B 49/00 |
| 10,890,066 B1 * | 1/2021 | Ibrahim | E21B 49/087 |
| 2018/0202264 A1 * | 7/2018 | Sarduy | G06N 20/00 |

FOREIGN PATENT DOCUMENTS

| | | | | |
|---|---|---|---|---|
| CN | 105467465 A | * | 5/2015 | |
| CN | 107165621 A | * | 9/2017 | E21B 49/00 |

OTHER PUBLICATIONS

Ma, M., M. Zeybek, and Fikri J. Kuchuk. "Integration of static and dynamic data for enhanced reservoir characterization, geological modeling and well performance studies." SPE Annual Technical Conference and Exhibition?. SPE, 2013. (Year: 2013).*

* cited by examiner

*Primary Examiner* — Matthew G Marini
(74) *Attorney, Agent, or Firm* — Fish & Richardson P.C.

(57) ABSTRACT

Systems and methods include a computer-implemented method for determining relative productivity. A thorium-uranium ratio for a region of interest is determined by a diagenesis-calibrated rock quality (DCRQ) system using exploration and production (E&P) data. A percentage of siltstone in a lithology matrix for the region of interest is determined using the E&P data. A difference between a neutron porosity and a sandstone density porosity for the region of interest is determined using the E&P data. A rock testability index for the region of interest is determined. Relative productivity for the region of interest is determined using i) the thorium-uranium ratio, ii) the percentage of siltstone in the lithology matrix, iii) the difference between the neutron porosity and the sandstone density porosity, and iv) the rock testability index. Drilling parameters for use in upcoming drilling operations for wells in the region of interest are determined using the relative productivity.

20 Claims, 5 Drawing Sheets

DIAGENESIS-CALIBRATED ROCK QUALITY (DCRQ) DETERMINATION

TECHNICAL FIELD

The present disclosure applies to determining rock quality, such as associated with drilling for an oil well.

BACKGROUND

Conventional log analysis of reservoirs in oil wells cannot distinguish between productive and non-productive layers due to geological complexity. In some sandstone reservoirs, for example, conventional log analysis displays common values across the entire target interval without contrast between productive and non-productive data. Dynamic tests and core plug analysis may show that portions of reservoir layers contribute to the majority of flow in some complex sandstone reservoirs with average porosity.

SUMMARY

The present disclosure describes techniques that can be used for diagenesis-calibrated rock quality (DCRQ) determination, e.g., while drilling for an oil well. In some implementations, a computer-implemented method includes the following. A thorium-uranium ratio for a region of interest is determined by a diagenesis-calibrated rock quality (DCRQ) system using exploration and production (E&P) data. A percentage of siltstone in a lithology matrix for the region of interest is determined by the DCRQ system using the E&P data. A difference between a neutron porosity and a sandstone density porosity for the region of interest is determined by the DCRQ system using the E&P data. A rock testability index for the region of interest is determined by the DCRQ system using the E&P data. Relative productivity for the region of interest is determined by the DCRQ system using i) the thorium-uranium ratio, ii) the percentage of siltstone in the lithology matrix, iii) the difference between the neutron porosity and the sandstone density porosity, and iv) the rock testability index. Drilling parameters for use in upcoming drilling operations for wells in the region of interest are determined using the relative productivity.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. The techniques can be used to identify high success probability areas in a field to drill future wells. The techniques can also be used to identify high success probability completion intervals to specifically target hydrocarbon productive zones in ambiguous formations. Such techniques can be used with machine learning (ML) in completion design, including to assess a pre-determined number of (e.g., four) independent metrics for zone selection. Using the techniques can increase an overall success rate of producing from complex sandstone reservoirs due to the following. Overall well costs can be reduced or minimized. Recovery factors can be improved. An even distribution of hydrocarbon drainage can be realized. The required number of development wells can be reduced. The well completion design stage can be expedited. Hydrocarbon production rates can be maximized. Additional dynamic data for future planning from productive layers can be acquired. Well placement can be guided to maximize reservoir contact in complex, tight reservoirs. Correlations can be simplified between mother bores and surrounding wells for stratigraphic layers. Direct correlations can be made with productive zone rock quality once surrounding wells processing and interpretation are synchronized using the techniques of the present disclosure.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for generating a diagenesis-calibrated rock quality (DCRQ) determination, e.g., while drilling for an oil well. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The techniques of the present disclosure can follow a workflow that combines independently verified parameters from downhole measurements through a set of calibrated parameters to estimate critical sandstone reservoir properties related to hydrocarbon productivity. Steps of the workflow process can consider raw and analyzed independent log data types. Steps of the workflow process can be used to generate a model that represents (and includes relationships defining) how reservoir productivity is related to each data type from a static and dynamic perspective. Insights from these relationships can serve as a guide in determining target production layers.

Figure 1:
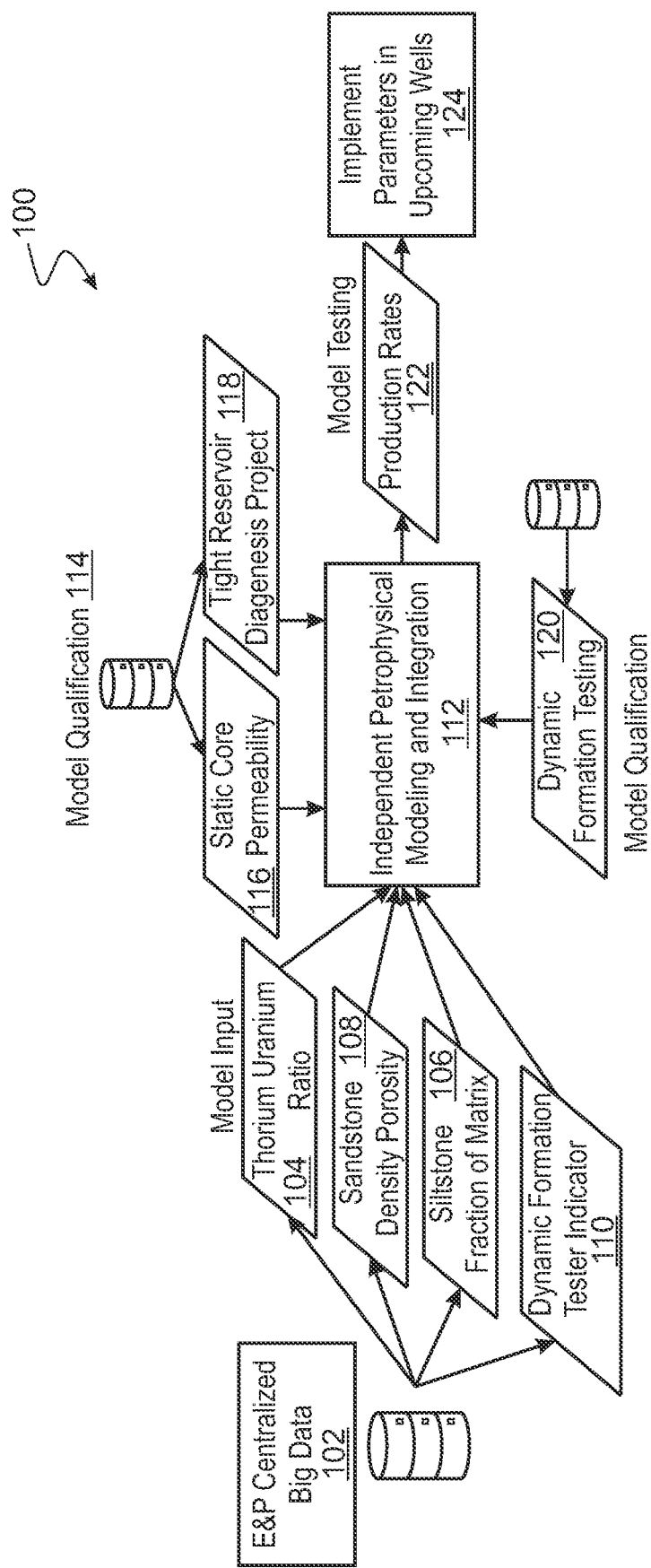
FIG. 1 is a flow chart showing an example of a workflow for performing an independent verification of tight reservoir productivity, according to some implementations of the present disclosure.

FIG. 1 is a flow chart showing an example of a workflow 100 for performing an independent verification of tight reservoir productivity, according to some implementations of the present disclosure. The workflow 100 can be used to determine the most productive reservoir layers of a reservoir. This can be done by integrating multiple types of input that require basic logs in order to accurately determine the most productive layers without expensive logging tools or coring the formation.

As a first step in the workflow 100, relevant data is retrieved from a centralized exploration and production (E&P) database, e.g., from E&P centralized big data 102. The relevant data of model input retrieved from the model are downloaded and go through a general quality assurance/quality check (QA/QC) process to ensure consistency and accuracy.

Parameterization of Qualitative Data

The model input data type is numerical and qualitative, including information such as the fraction of siltstone present in sandstone layers. For example, there may be no established cut-off for an amount of siltstone that will classify a zone as productive or otherwise. The cut-off may be subjective and can vary between fields. Multiple independent qualitative data types can be parameterized to enable identification of productive reservoir layers using numerical calculations performed on qualitative data. This can be done, for example, by identifying numerical relationships between the qualitative model input and dynamic model qualification data.

Combining Four Model Input Methodologies

Each of four individual methodologies described next can increase the chances of success on its own for predicting rock qualities. Moreover, combining the four independent methodologies together can lead to targeting productive layers with an unprecedented success rate.

Model Input Methodology 1—Thorium-Uranium Ratio (TURA)

A Thorium-Uranium Ratio (TURA) 104 can be calculated by dividing two logs that are generated, for example, by a Spectral Gamma Ray Logging Tool (SGR). The two logs can include Thorium concentration (THOR) and Uranium concentration (URAN), both measured in parts per million (ppm). The TURA ratio can be calculated as:

$$TURA = \frac{THOR}{URAN}, \text{ unitless and constrained between 0.1 and 100} \quad (1)$$

Radioactive elements can indicate the minerals and lithological composition of a geological format. As a result, a qualitative relationship between TURA and reservoir productivity can be estimated.

Figures 2A, 2B:
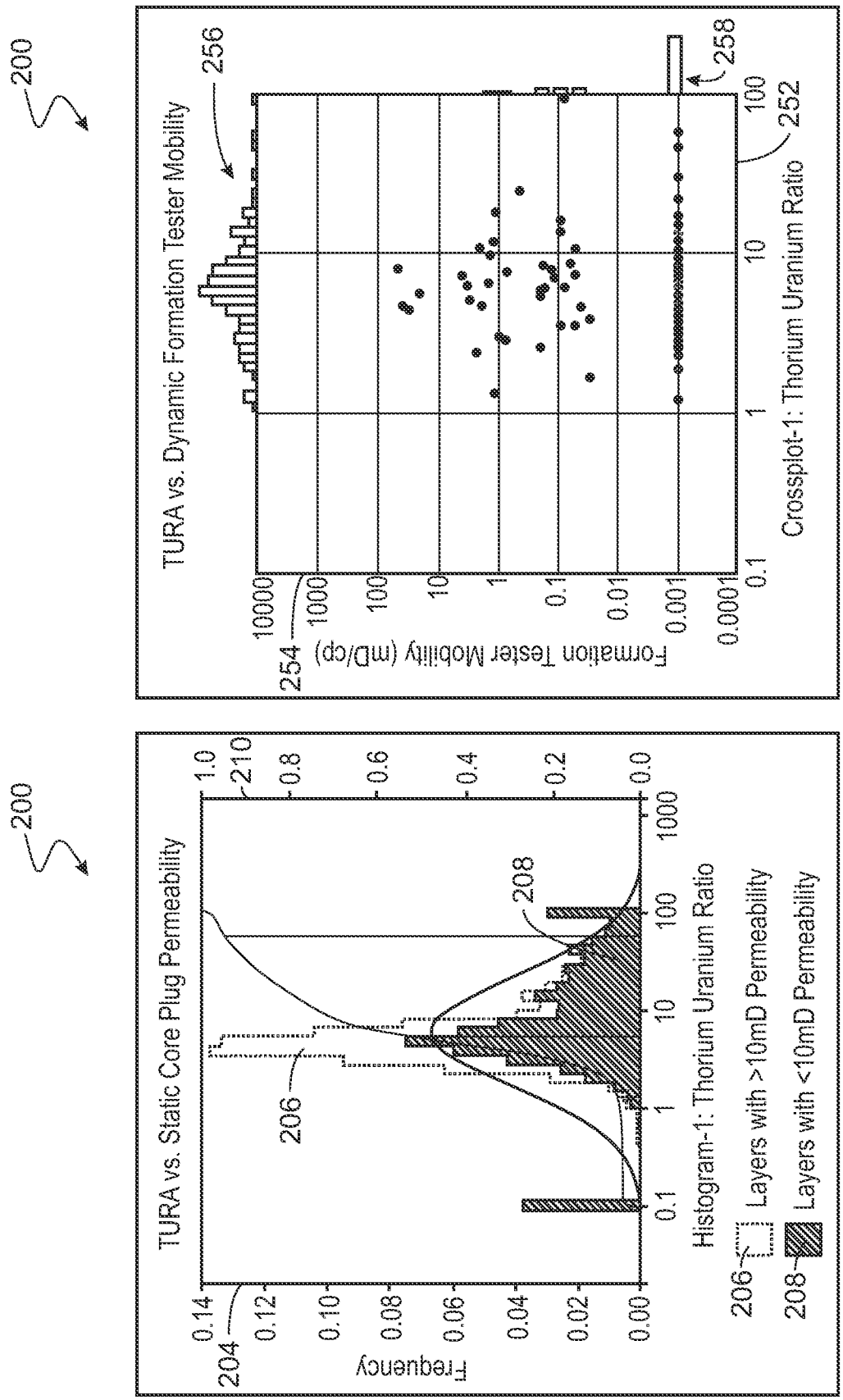
FIGS. 2A and 2B are graphs showing examples of static and dynamic data modeling method for a Thorium-Uranium Ratio (TURA), according to some implementations of the present disclosure.

FIGS. 2A and 2B are graphs 200 and 250 showing examples of static and dynamic data modeling method for a TURA, according to some implementations of the present disclosure. Graph 200 is a plot of TURA versus static core plus permeability. During experimentation, when the lab measured core-plug permeability data was used to color the histogram of TURA values of multiple wells in the field, it was discovered that layers with TURA ratios of 3-9 have significantly higher probability of being productive than otherwise. Referring to FIG. 2A, the graph 200 shows that shaded portions 208 occupy the largest area between TURA values 202 of roughly 3-9 (e.g., layers 206 with >10 millidarcies (mD) of permeability, versus layers 208 with <10 mD of permeability), while it is rare in TURA values less than 3 or greater than 9. The graph 200 is plotted relative to the TURA values 202 and a frequency 204 (e.g., a count). The graph 200 includes a cumulative frequency 210 ranging from 0 to 1 (in fractions, summing to 1 once all the samples are taken into account). Referring to FIG. 2B, the graph 250 is a crossplot of TURA 252 versus dynamic formation tester mobility 254. A frequency formation tester mobility 256 across a TURA scale is a frequency of mobility across a mobility range 258.

Although some elements of the graphs 200 and 250 are represented in grayscale in FIGS. 2A and 2B, some elements can be depicted in color, e.g., using different colors for each of the layers 206 and 208. The graphs 200 and 250 and/or similar graphs can be presented users (e.g., geologists or petroleum engineers, to name a few) in a user interface, such as on computers at the surface of a drilling operation or at a location remote from drilling operations. Colors can be used in the graphs 200 and 250 to representing data density at each x-y point. This can represent relative numbers of samples at that particular point (e.g., where red is the highest count and green is the lowest count).

Model Input Methodology 2—Percentage of Siltstone in the Lithology Matrix

Analysis occurred on the effect of siltstone on model qualification parameters as silt is known to have adverse effects on permeability and as a result reduces productivity. Layers with smaller fraction of siltstone to the total matrix 106 have shown a clear trend of higher reservoir productivity. The methodologies of the present disclosure introduce cut-off values to the siltstone fraction to differentiate productive layers. If a layer has a silt percentage below 60% out of the total matrix, the layer will likely be productive.

Model Input Methodology 3—The Difference Between Neutron Porosity and Sandstone Density Porosity Analysis and comparisons occurred on the reservoir productivity data and the difference between neutron porosity and sandstone density porosity 108. This led to determining a clear cutoff value above which the reservoir layers have high probability of being productive. Layers where the difference between neutron porosity and sandstone density porosity exceeds 0.02 percent volume per volume (v/v) have a higher probability of being productive.

Model Input Methodology 4—Rock Testability Index (RTI)

A rock testability index can be analyzed, e.g., using a dynamic formation tester indicator 110, which examines the probability of conductive a valid formation test at a specific depth by assigning a numerical category integer to each depth. The higher the number, the higher the chance of acquiring a valid formation test. Experimentation found a clear correlation between high RTI intervals, above 4, and excellent reservoir properties to target based on the modeling methodologies of the present disclosure.

The four methodologies can serve as input to an independent petrophysical modeling and integration 112. Other inputs include model qualification information 114 (e.g., static core permeability 116 and tight reservoir diagenesis project information 118) and dynamic formation testing 120. Outputs of the independent petrophysical modeling and integration 112 include estimated production rates 122 (e.g., to provide verification with the production rates). The estimated production rates 122 can serve as input for determining and implementing drilling parameters in upcoming wells 124 to achieve a targeted DCRQ. For example, the drilling parameters and well trajectory can be based on nearby well correlation and area understanding or the DCRQ distribution. Going from step 122 to 124 can include verifying an independent petrophysical model and model parameters based on a production rate.

Experimentation

Figure 3:
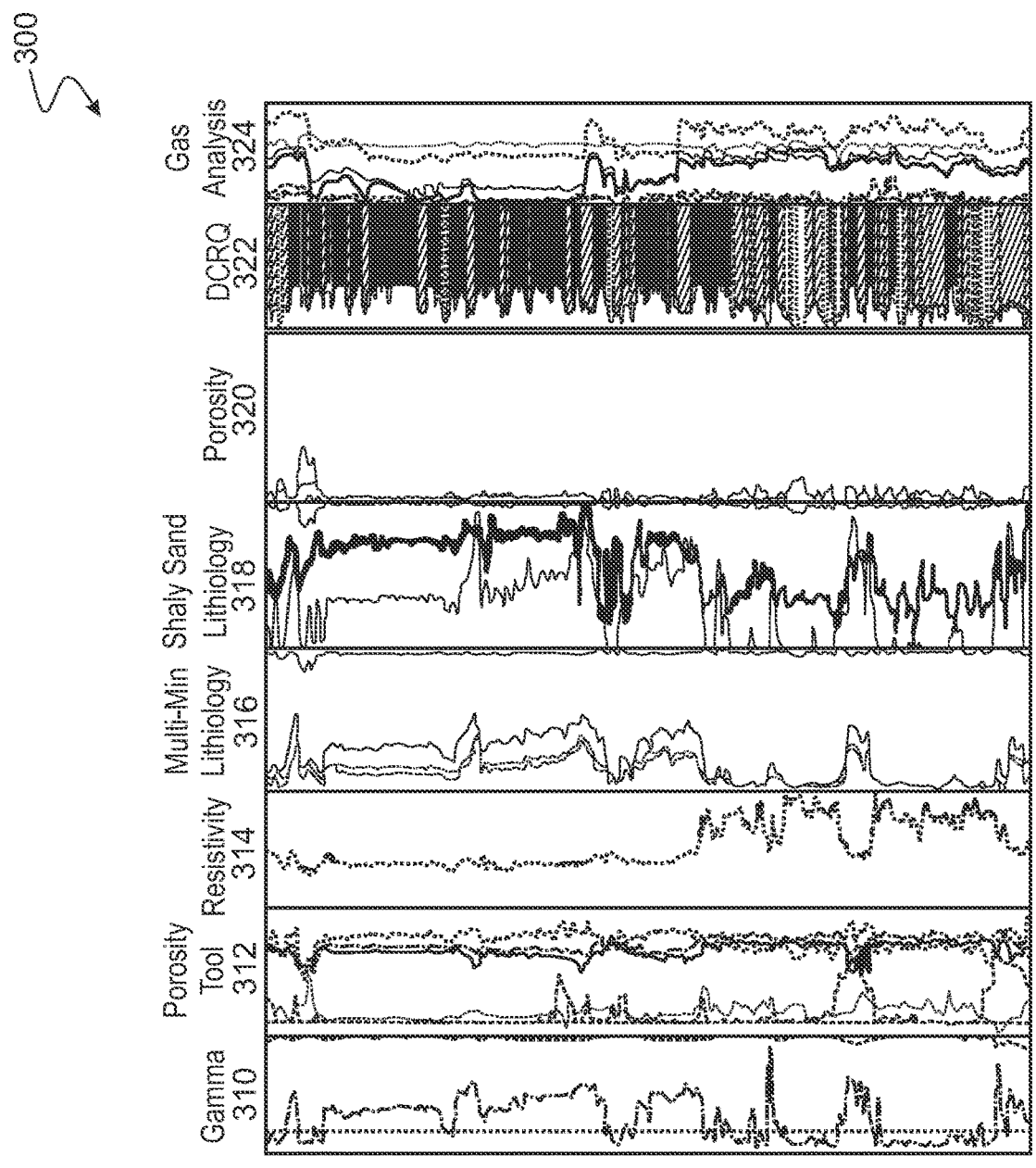
FIG. 3 is a chart showing examples of results of logs resulting from applying methodologies on a tight gas reservoir, according to some implementations of the present disclosure.

FIG. 3 is a chart 300 showing examples of results of logs resulting from applying methodologies on a tight gas reservoir, according to some implementations of the present disclosure. The chart 300 includes an DCRQ key 302, facies labels 304, a quality spectrum scale from best quality 306 to poorest quality 308, a gamma plot 310, a porosity tool plot 312, a resistivity plot 314, a multi-mineral (multi-min) lithology plot 316, a shaly sand lithology plot 318, a porosity plot 320, an DCRQ plot 322, and a gas analysis plot 324. Although elements of the chart 300 are represented in grayscale in FIG. 3, the elements can be depicted in color, e.g., using a color spectrum corresponding to the facies labels 304 and a color spectrum corresponding to the quality spectrum scale, ranging from the best quality 306 to the poorest quality 308. Chart 300 and/or similar charts can be presented users (e.g., geologists or petroleum engineers, to name a few) in a user interface, such as on computers at the surface of a drilling operation or at a location remote from drilling operations.

Implementations of the present disclosure can be developed and implemented using the following. Databases of formation tester pressure and sampling can be assessed to determine initial performance sensitive parameters. Geological data bases and descriptions can be incorporated and integrated into data analyses. Well completion and performance data can be used as part of validation process. Multiple parameters can be tested and implemented into the methodology. Databases of available static and dynamic information can be gathered and assessed in terms of quality and quantity of model data. Validation data bases can be developed and used in validation of the techniques of the present disclosure. Computer applications can be generated for preparing and presenting visualizations used in discovering and implementing methodologies of the present disclosure. Models can be verified and used for blind testing of wells from static and dynamic perspectives. Specific wells can be chosen and used in proof-of-concept trials.

Experimentation using techniques of the present disclosure has shown that measurements for porosity, permeability, diagenesis description, and SEM acquired from proprietary data bases can be used to identify productive layers below a company's net pay and net reservoir petrophysical parameters cut-off. Further, productive intervals in a horizontal well can be differentiated from nonproductive intervals in the horizontal well.

Figure 4:
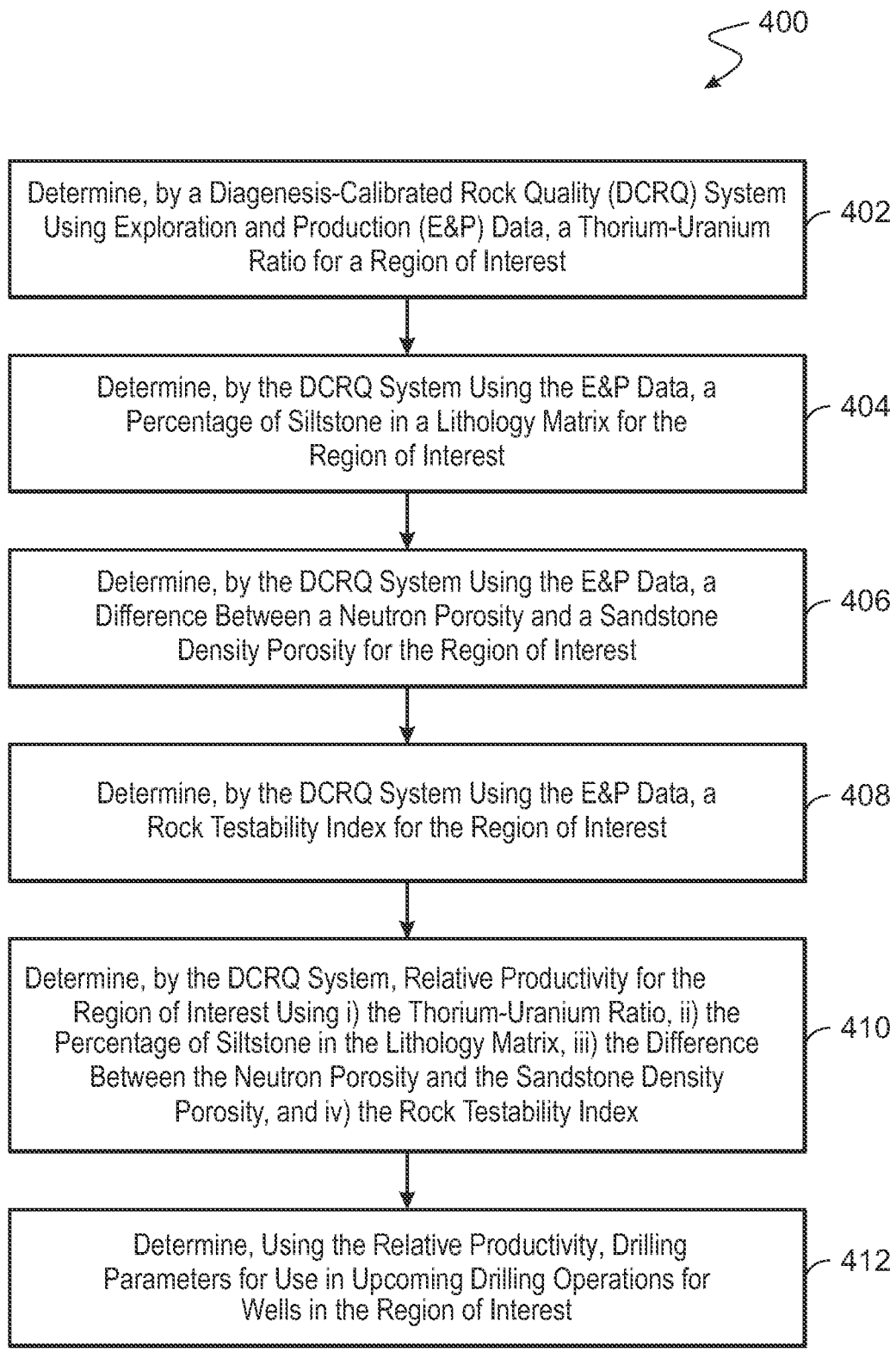
FIG. 4 is a flowchart of an example of a method for generating a diagenesis-calibrated rock quality (DCRQ) determination, according to some implementations of the present disclosure.

FIG. 4 is a flowchart of an example of a method 400 for generating a DCRQ determination, according to some implementations of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order.

At 402, a thorium-uranium ratio for a region of interest is determined by a DCRQ system using E&P data. For example, the E&P data can be retrieved from a centralized E&P database based on the region of interest identified by the DCRQ system. In some implementations, a user interface can be provided for user selection of one or more parameters for finding regions of interest for calibrating drilling and production data. The locations and shapes of regions of interest can depend on geological environments and mineralogy, covering layers, reservoirs, and formations.

In some implementations, a QA/QC can be performed on the E&P data in the E&P database to ensure consistency and accuracy. From 402, method 400 proceeds to 404.

At 404, a percentage of siltstone in a lithology matrix for the region of interest is determined by the DCRQ system using the E&P data. Percentages of siltstones can be calibrated depending on reservoirs and geological environments. Calibration references can include X-ray diffraction (XRD), X-ray fluorescence (XRF), core sample description, mud log descriptions, log measurements (e.g., resistivity images and nuclear magnetic resonance, formation tester mobility, and sedimentology statistics. From 404, method 400 proceeds to 406.

At 406, a difference between a neutron porosity and a sandstone density porosity for the region of interest is determined by the DCRQ system using the E&P data, e.g., calibrated to siltstone percentages determined at 404. From 406, method 400 proceeds to 408.

At 408, a rock testability index for the region of interest is determined by the DCRQ system using the E&P data. For example, rock testability indices can be determined for formation testing. From 408, method 400 proceeds to 410.

At 410, relative productivity for the region of interest is determined by the DCRQ system using i) the thorium-uranium ratio, ii) the percentage of siltstone in the lithology matrix, iii) the difference between the neutron porosity and the sandstone density porosity, and iv) the rock testability index. For example, determining the relative productivity for the region of interest can include using an independent petrophysical modeling and integration application as described with reference to FIGS. 2A-2B. Determining the relative productivity can include using: i) static core permeability data, ii) tight reservoir diagenesis project data, and iii) dynamic formation testing data. From 410, method 400 proceeds to 412.

At 412, drilling parameters for use in upcoming drilling operations for wells in the region of interest are determined using the relative productivity. Determining the drilling parameters for use in the upcoming drilling operations can include drilling parameters that depend on the well placement selection. The DCRQ can provide the rock quality, hence the drilling parameters used for particular DCRQ rocks within the vicinity can be utilized for the new well. After 412, method 400 can stop.

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include forming/drilling a wellbore, hydraulic fracturing, and producing through the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in, drilling parameters (including drill bit speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions. The techniques can allow well placement operations to identify/recognize whether a well path is within or exiting targeted layers, thus to allow and facilitate adjustments to well trajectories.

Figure 5:
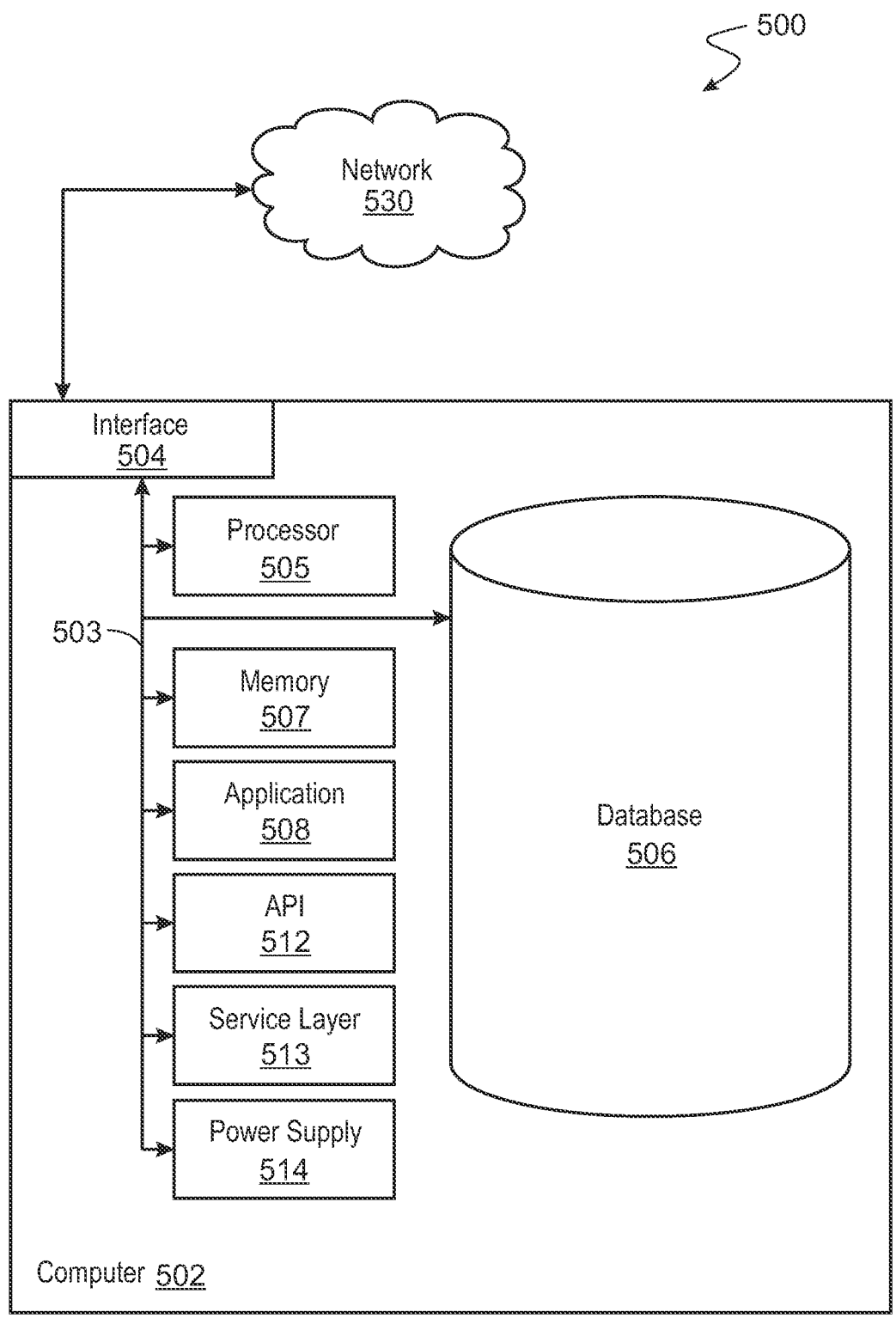
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes the following. A thorium-uranium ratio for a region of interest is determined by a diagenesis-calibrated rock quality (DCRQ) system using exploration and production (E&P) data. A percentage of siltstone in a lithology matrix for the region of interest is determined by the DCRQ system using the E&P data. A difference between a neutron porosity and a sandstone density porosity for the region of interest is determined by the DCRQ system using the E&P data. A rock testability index for the region of interest is determined by the DCRQ system using the E&P data. Relative productivity for the region of interest is determined by the DCRQ system using i) the thorium-uranium ratio, ii) the percentage of siltstone in the lithology matrix, iii) the difference between the neutron porosity and the sandstone density porosity, and iv) the rock testability index. Drilling parameters for use in upcoming drilling operations for wells in the region of interest are determined using the relative productivity.

The foregoing and other described implementations can each, optionally, include one or more of the following features:

A first feature, combinable with any of the following features, the method further including performing a quality assurance/quality check (QA/QC) on the E&P data in the E&P database to ensure consistency and accuracy.

A second feature, combinable with any of the previous or following features, the method further including retrieving the E&P data from a centralized E&P database based on the region of interest identified by the DCRQ system.

A third feature, combinable with any of the previous or following features, where determining the relative productivity for the region of interest includes using an independent petrophysical modeling and integration application.

A fourth feature, combinable with any of the previous or following features, where determining the relative productivity includes using: i) static core permeability data, ii) tight reservoir diagenesis project data, and iii) dynamic formation testing data.

A fifth feature, combinable with any of the previous or following features, where determining the drilling parameters for use in the upcoming drilling operations includes drilling parameters for well trajectory, the drilling parameters based on nearby well correlation, area understanding, and DCRQ distribution.

A sixth feature, combinable with any of the previous or following features, the method further including verifying an independent petrophysical model and model parameters based on a production rate.

A seventh feature, combinable with any of the previous or following features, the method further including providing a user interface for user selection of one or more parameters for finding regions of interest for calibrating drilling and production data.

In a second implementation, a non-transitory, computer-readable medium stores one or more instructions executable by a computer system to perform operations including the following. A thorium-uranium ratio for a region of interest is determined by a diagenesis-calibrated rock quality (DCRQ) system using exploration and production (E&P) data. A percentage of siltstone in a lithology matrix for the region of interest is determined by the DCRQ system using the E&P data. A difference between a neutron porosity and a sandstone density porosity for the region of interest is determined by the DCRQ system using the E&P data. A rock testability index for the region of interest is determined by the DCRQ system using the E&P data. Relative productivity for the region of interest is determined by the DCRQ system using i) the thorium-uranium ratio, ii) the percentage of siltstone in the lithology matrix, iii) the difference between the neutron porosity and the sandstone density porosity, and iv) the rock testability index. Drilling parameters for use in upcoming drilling operations for wells in the region of interest are determined using the relative productivity.

The foregoing and other described implementations can each, optionally, include one or more of the following features:

A first feature, combinable with any of the following features, the operations further including performing a quality assurance/quality check (QA/QC) on the E&P data in the E&P database to ensure consistency and accuracy.

A second feature, combinable with any of the previous or following features, the operations further including retrieving the E&P data from a centralized E&P database based on the region of interest identified by the DCRQ system.

A third feature, combinable with any of the previous or following features, where determining the relative productivity for the region of interest includes using an independent petrophysical modeling and integration application.

A fourth feature, combinable with any of the previous or following features, where determining the relative productivity includes using: i) static core permeability data, ii) tight reservoir diagenesis project data, and iii) dynamic formation testing data.

A fifth feature, combinable with any of the previous or following features, where determining the drilling parameters for use in the upcoming drilling operations includes drilling parameters for well trajectory, the drilling parameters based on nearby well correlation, area understanding, and DCRQ distribution.

A sixth feature, combinable with any of the previous or following features, the operations further including verifying an independent petrophysical model and model parameters based on a production rate.

A seventh feature, combinable with any of the previous or following features, the operations further including providing a user interface for user selection of one or more parameters for finding regions of interest for calibrating drilling and production data.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A thorium-uranium ratio for a region of interest is determined by a diagenesis-calibrated rock quality (DCRQ) system using exploration and production (E&P) data. A percentage of siltstone in a lithology matrix for the region of interest is determined by the DCRQ system using the E&P data. A difference between a neutron porosity and a sandstone density porosity for the region of interest is determined by the DCRQ system using the E&P data. A rock testability index for the region of interest is determined by the DCRQ system using the E&P data. Relative productivity for the region of interest is determined by the DCRQ system using i) the thorium-uranium ratio, ii) the percentage of siltstone in the lithology matrix, iii) the difference between the neutron porosity and the sandstone density porosity, and iv) the rock testability index. Drilling parameters for use in upcoming drilling operations for wells in the region of interest are determined using the relative productivity.

The foregoing and other described implementations can each, optionally, include one or more of the following features:

A first feature, combinable with any of the following features, the operations further including performing a quality assurance/quality check (QA/QC) on the E&P data in the E&P database to ensure consistency and accuracy.

A second feature, combinable with any of the previous or following features, the operations further including retrieving the E&P data from a centralized E&P database based on the region of interest identified by the DCRQ system.

A third feature, combinable with any of the previous or following features, where determining the relative productivity for the region of interest includes using an independent petrophysical modeling and integration application.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   determining, by a diagenesis-calibrated rock quality (DCRQ) system using exploration and production (E&P) data, a thorium-uranium ratio for a region of interest;
   determining, by the DCRQ system using the E&P data, a percentage of siltstone in a lithology matrix for the region of interest;
   determining, by the DCRQ system using the E&P data, a difference between a neutron porosity and a sandstone density porosity for the region of interest;
   determining, by the DCRQ system using the E&P data, a rock testability index for the region of interest;
   determining, by the DCRQ system, using a petrophysical model, a relative productivity for the region of interest, the petrophysical model combining i) the thorium-uranium ratio, ii) the percentage of siltstone in the lithology matrix, iii) the difference between the neutron porosity and the sandstone density porosity, and iv) and the rock testability index, the petrophysical model generating the relative productivity for the region of interest as a comparisons of productive reservoir layers of a reservoir, the relative productivity being proportional with the thorium-uranium ratio, the difference between the neutron porosity and the sandstone density porosity, and the rock testability index, the relative productivity being inversely proportional with the percentage of siltstone in the lithology matrix;

determining, using the relative productivity, drilling parameters for use in upcoming drilling operations for wells in the region of interest; and executing drilling operations for wells in the region of interest using the drilling parameters.

2. The computer-implemented method of claim 1, further comprising:

performing a quality assurance/quality check (QA/QC) on the E&P data in the E&P database to ensure consistency and accuracy.

3. The computer-implemented method of claim 1, further comprising:

retrieving the E&P data from a centralized E&P database based on the region of interest identified by the DCRQ system.

4. The computer-implemented method of claim 1, wherein the relative productivity for the region of interest is determined by using an independent petrophysical modeling and integration application.

5. The computer-implemented method of claim 1, wherein determining the relative productivity is based on: i) static core permeability data, ii) tight reservoir diagenesis project data, and iii) dynamic formation testing data.

6. The computer-implemented method of claim 1, wherein the drilling parameters for use in the upcoming drilling operations comprise well trajectory.

7. The computer-implemented method of claim 1, further comprising:

verifying an independent petrophysical model and model parameters based on a production rate.

8. The computer-implemented method of claim 1, further comprising:

providing a user interface for user selection of one or more parameters for finding regions of interest for calibrating drilling and production data.

9. A non-transitory, computer-readable medium storing one or more instructions executable by a computer system to perform operations comprising:

determining, by a diagenesis-calibrated rock quality (DCRQ) system using exploration and production (E&P) data, a thorium-uranium ratio for a region of interest;

determining, by the DCRQ system using the E&P data, a percentage of siltstone in a lithology matrix for the region of interest;

determining, by the DCRQ system using the E&P data, a difference between a neutron porosity and a sandstone density porosity for the region of interest;

determining, by the DCRQ system using the E&P data, a rock testability index for the region of interest;

determining, by the DCRQ system, using a petrophysical model, a relative productivity for the region of interest, the petrophysical model combining i) the thorium-uranium ratio, ii) the percentage of siltstone in the lithology matrix, iii) the difference between the neutron porosity and the sandstone density porosity, and iv) and the rock testability index, the petrophysical model generating the relative productivity for the region of interest as a comparisons of productive reservoir layers of a reservoir, the relative productivity being proportional with the thorium-uranium ratio, the difference between the neutron porosity and the sandstone density porosity, and the rock testability index, the relative productivity being inversely proportional with the percentage of siltstone in the lithology matrix;

determining, using the relative productivity, drilling parameters for use in upcoming drilling operations for wells in the region of interest; and executing drilling operations for wells in the region of interest using the drilling parameters.

10. The non-transitory, computer-readable medium of claim 9, the operations further comprising:

performing a quality assurance/quality check (QA/QC) on the E&P data in the E&P database to ensure consistency and accuracy.

11. The non-transitory, computer-readable medium of claim 9, the operations further comprising:

retrieving the E&P data from a centralized E&P database based on the region of interest identified by the DCRQ system.

12. The non-transitory, computer-readable medium of claim 9, wherein the relative productivity for the region of interest is determined by using an independent petrophysical modeling and integration application.

13. The non-transitory, computer-readable medium of claim 9, wherein determining the relative productivity is based on: i) static core permeability data, ii) tight reservoir diagenesis project data, and iii) dynamic formation testing data.

14. The non-transitory, computer-readable medium of claim 9, wherein the drilling parameters for use in the upcoming drilling operations comprise well trajectory.

15. The non-transitory, computer-readable medium of claim 9, the operations further comprising:

verifying an independent petrophysical model and model parameters based on a production rate.

16. The non-transitory, computer-readable medium of claim 9, the operations further comprising:

providing a user interface for user selection of one or more parameters for finding regions of interest for calibrating drilling and production data.

17. A computer-implemented system, comprising:

one or more processors; and a non-transitory computer-readable storage medium coupled to the one or more processors and storing programming instructions for execution by the one or more processors, the programming instructions instructing the one or more processors to perform operations comprising:

determining, by a diagenesis-calibrated rock quality (DCRQ) system using exploration and production (E&P) data, a thorium-uranium ratio for a region of interest;

determining, by the DCRQ system using the E&P data, a percentage of siltstone in a lithology matrix for the region of interest;

determining, by the DCRQ system using the E&P data, a difference between a neutron porosity and a sandstone density porosity for the region of interest;

determining, by the DCRQ system using the E&P data, a rock testability index for the region of interest;

determining, by the DCRQ system, using a petrophysical model, a relative productivity for the region of interest, the petrophysical model combining i) the thorium-uranium ratio, ii) the percentage of siltstone in the lithology matrix, iii) the difference between the neutron porosity and the sandstone density porosity, and iv) and the rock testability index, the petrophysical model generating the relative productivity for the region of interest as a comparisons of productive reservoir layers of a reservoir, the relative productivity being proportional with the thorium-uranium ratio, the difference between the neutron porosity and the sandstone density porosity, and the rock testability index, the relative productivity being inversely proportional with the percentage of siltstone in the lithology matrix;

determining, using the relative productivity, drilling parameters for use in upcoming drilling operations for wells in the region of interest; and executing drilling operations for wells in the region of interest using the drilling parameters.

18. The computer-implemented system of claim 17, the operations further comprising:

performing a quality assurance/quality check (QA/QC) on the E&P data in the E&P database to ensure consistency and accuracy.

19. The computer-implemented system of claim 17, the operations further comprising:

retrieving the E&P data from a centralized E&P database based on the region of interest identified by the DCRQ system.

20. The computer-implemented system of claim 17, wherein determining the relative productivity for the region of interest includes using an independent petrophysical modeling and integration application.

\* \* \* \* \*